United States Patent [19]

McCreary

[11] Patent Number: 4,852,223
[45] Date of Patent: Aug. 1, 1989

[54] CLOTHING CORD SECURING CLAMP

[76] Inventor: John C. McCreary, 355 S. Madison, Apt. 207, Pasadena, Calif. 91101

[21] Appl. No.: 323,683

[22] Filed: Mar. 15, 1989

[51] Int. Cl.[4] ............................................. F16G 11/00
[52] U.S. Cl. ..................................... 24/115 G; 24/117
[58] Field of Search ................. 24/117 R, 115 G, 118, 24/119, 140; 36/50

[56] References Cited

U.S. PATENT DOCUMENTS

| | | | |
|---|---|---|---|
| 2,236,506 | 4/1941 | Hirsch | 24/115 G |
| 3,074,135 | 1/1963 | Brodowski | 24/117 R |
| 4,288,891 | 9/1981 | Boden | 24/115 G |
| 4,328,605 | 5/1982 | Hutchison et al. | 24/115 G |
| 4,453,292 | 6/1984 | Bakker | 24/115 G |
| 4,506,417 | 3/1985 | Hara | 24/115 G |
| 4,622,723 | 11/1986 | Krauss | 24/115 G |
| 4,811,466 | 3/1989 | Zubli | 24/115 G |

Primary Examiner—Victor N. Sakran
Attorney, Agent, or Firm—J. L. Jones

[57] ABSTRACT

A cord clamp provides a device for securing shoe laces, belts and tie cords with advertising possibilities. The cord clamp has a thin uniform thickness wall elastomeric hemisphere of a plastic composition, with a centrally disposed post radially projecting integrally inwardly. A central first aperture pierces the post, the first aperture being disposed in and through the post parallel to the hemisphere diameter, the post having a length disposed just short of the sphere radius length. The hemisphere wall has an interiorly disposed recessed groove therein, adjacent and around the hemisphere edge. A rigid, thin circular plate has a second central aperture disposed there through which allows the encompassing hemisphere to be inwardly flexed and the short post to move through the second aperture positioned in the circular plate. By feeding a pair of shoe laces through the central first aperture in the post, in opposed directions, and then releasing the finger pressure on the elastomeric hemisphere, the pair of laces are secured against the rigid plate, instead of tying the laces. Advertising indicia can be disposed on the exterior top of the resilient hemisphere.

5 Claims, 1 Drawing Sheet

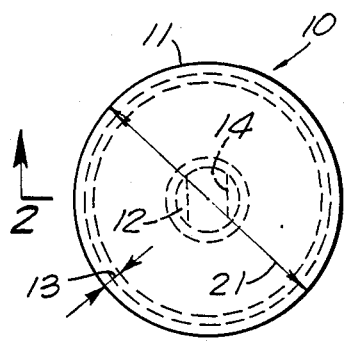
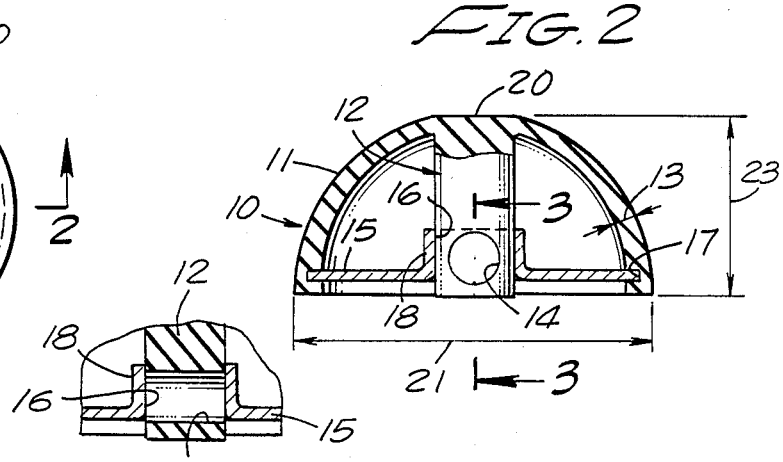
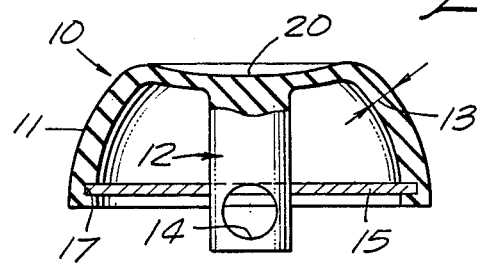
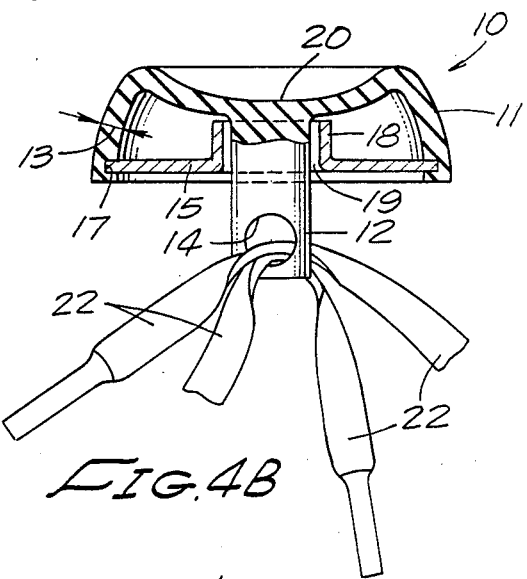
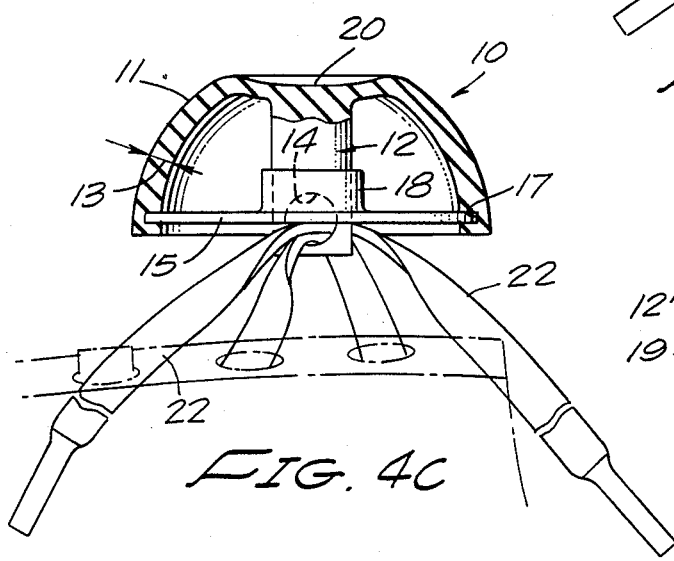
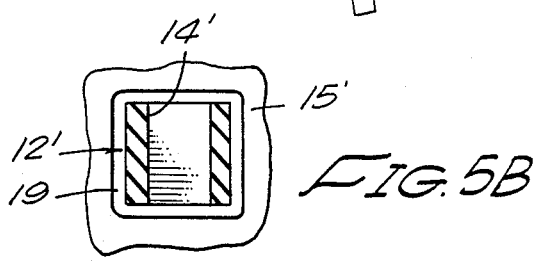
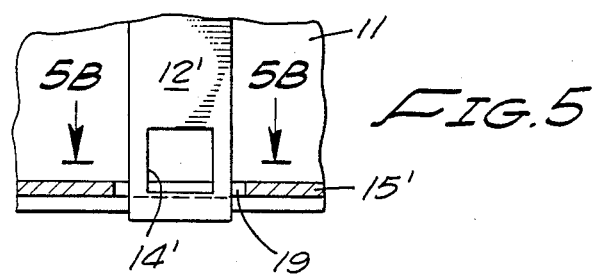
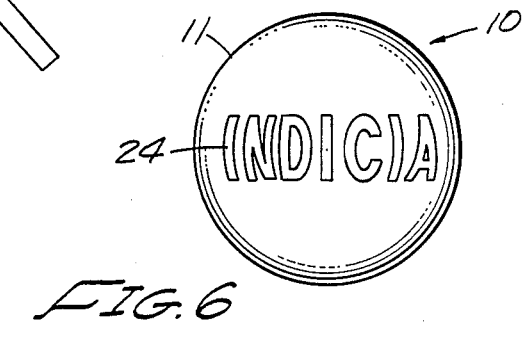

CLOTHING CORD SECURING CLAMP

BACKGROUND OF THE INVENTION

The shoe tying cord clamp of this invention is classified in Class 24/115G, 107.

In the French Pat. No. 350,582 of June 17, 1905 there is disclosed a spiral spring biased button which is utilized to secure a cravate or the like, by M. A. Baurose.

Hirsch, in U.S. Pat. No. 2,236,506 of Apr. 1, 1941, discloses and teaches a shoelace holding device having a biased spring securing shoelaces or equivalent laced bags.

Boden, in U.S. Pat. No. 4,288,891 issued Sept. 15, 1981, teaches and discloses a cord locking device having a coil spring pressing a slidable plunger against cord or cords, thus securing the cord or cords.

Hutchison and Robb in U.S. Pat. No. 4,328,605, issued May 11, 1982, teach and disclose a cord clamp utilizing close fitting telescoping member pairs having alignable transverse bores which are keyed for co-registration of cords and biased by a coiled spring.

Bakker, in U.S. Pat. No. 4,453,292 issued June 12, 1984, teaches and discloses a cord lock having a molded plastic cylinder, a molded plastic piston, and a biasing coil spring. The cord is secured between the cylinder and piston, when their confronting apertures are aligned.

Hara, in U.S. Pat. No. 4,506,417, issued Mar. 26, 1985, teaches and discloses a fastener for string having a coiled steel spring energizing force applied in cylinder and piston pair of housing securing a pair of strings.

Krauss, in U.S. Pat. No. 4,622,723, issued Nov. 18. 1986, teaches and discloses a cord lock plastic housing and a plunger, with a spring disposed in the housing. The housing and plunger have coincident holes which receive a cord locker in position by the spring.

All of the above prior art references have a spring operating under compression to secure a cord in position.

SUMMARY OF THE INVENTION

This cord clamp provides a device for easily securing shoe lace ends, or small decorative ends of a woven leather sport tie, or the like decorative cord belt.

A hemispheric shaped and elastomeric thin hollow wall plastic composition has a centrally, integrally disposed post projecting inwardly along the hemisphere radius. A central first aperture pierces the post, the first aperture being disposed inward through the post parallel to and adjacent to the hemisphere diameter, the post having a length just short of the hemisphere radius. The hemisphere wall has an interiorly disposed recessed groove therein the wall, adjacent the hemisphere circumference. A rigid, thin circular plate has a second larger central aperture disposed therein, the second aperture being adaptively sized to fit around the projecting radial post. The central second aperture is adaptively sized to move around the central post, when the circular plate is fitted in the hemisphere recessed groove. The rigid thin circular plate can have a journal integrally affixed around one face of the plate, adjacent the hemisphere wall and second aperture. The journal is positioned to act as a guide for the integral post as it slidably oscillates through the second aperture.

By pressing inwardly on the peak exterior wall of the hemisphere, the post is moved through the second aperture of the circular plate, exposing the first aperture below the rigid plate. By feeding a pair of opposed shoe laces, or a pair of tie ends, or a pair of belt ends through the aperture of the exposed post and then releasing the finger pressure on the elastomeric hemisphere wall, the pair of ends of the ties are secured in place against the rigid plate, instead of tying the ties termini.

Decorative indicia or advertising indicia can be inscribed on the exterior of the clamp hemisphere. Miniature footballs, baseballs, or other advertising of sport teams can be secured on the exterior of the hemisphare.

Included in the objects of this invention are:

To provide a simple operating clamping device for decorative shoe laces.

To provide a simple clamping device for decorative sport ties around human necks.

To provide a simple clamping device for decorative belts for humans.

To provide a simple advertising indicia, which can be adapted to a specific team.

Other objects and advantages of this invention are taught in the following description and claims.

BRIEF DESCRIPTION OF THE DRAWINGS

The description of this invention is to be read in conjunction with the following drawings:

FIG. 1 is a top plan view of the clamp tying device of this invention illustrating an elastomeric plastic composition hemispheric outer shell.

FIG. 2 is an elevational cross-section of FIG. 1 through 2—2.

FIG. 3 is a fragmentary cross-sectional view of FIG. 2 in operation.

FIG. 4, A, B, C are elevational cross sectional views of the post illustrating the modification position of the first aperture and its modification in cross-sectional shape.

FIGS. 5 and 5B are modifications of the first aperture in side elevation and plan views.

FIG. 6 is a top plan view of the hemisphere illustrating the advertising indicia in position on the hemisphere.

DESCRIPTION OF THE PREFERRED EMBODIMENT OF THE INVENTION

Referring to FIGS. 1 and 2 collectively, the clothing cord securing clamp is first shown in plan top view and secondly in elevational side view through 2—2 of FIG. 1. The clothing cord securing clamp 10 has an elastomeric hemisphere 11 and an integral centrally disposed post 12. The thin wall of uniform thickness 13 of the hemisphere 11 is pliable and distortable under the finger pressure of a user and wearer of the cord securing clamp 10. A first aperture 14 pierces the integral post 12, the aperture 14 piercing the post parallel in direction to the full diameter 21 of the hemisphere 11.

A rigid thin circular plastic or equivalent thin metal plate 15 has a centrally disposed circular aperture 16 centered in plate 15. An interior groove 17 is disposed around and in the hemisphere 11 wall 13 adjacent to the hemisphere diameter 21. The thin, rigid circular plate 15 is adaptively sized in diameter and thickness to be tightly secured in the groove 17. A short sleeve 18 can be formed around 16 from plate 15 or it can be omitted as desired. The annular aperture 19 between post 12 and plate 15 can be sized to a regulated value. By squeezing the peak 20 of the hemisphere 11, the first post aperture 14 can be forced underneath the plate 15, whereupon the two laces of a shoe, tie or belt can be oppositely fed through aperture 14, as is illustrated in FIG. 4A and then FIG. 4B.

FIG. 3 is a partial elevational sectional view through 3—3 of FIG. 2 wherein the post 12 is shown depressed through the sleeve 18 of plate 15.

On releasing the finger pressure on the peak 20 of the clamp 10, as in FIG. 4C, the post 12 is pulled up toward the normal position of the peak 20, securing the laces, ties, or belt tips 22 against the plate 15.

FIGS. 5 and 5B illustrate a modification of the aperture 14' to an essentially first square aperture. There is no sleeve in plate 15', and the annular space 19' between the post 12' and the second aperture 16 provides a space 19' for easily moving post 12' through plate 15'. The first aperture 14 and 14' can be other shapes, such as rectangular, hexagonal or the like.

FIG. 6 is a representation of an advertising indicia 24 printed or embossed on the exterior face of the hemisphere of 10.

Dimensionally, the clamp 10 can range typically from ¾ to 3 inch in diameter 21. The height 23 of clamp 10 can be typically ½ to 1½ inch. Of course, the hemisphere 11 can be equivalently a hemisphere or a rectangle, with a raised peak 20'' or the like. The plan view of 10 can include a triangular shape, octagon or the like, with a peak 20'' which can be depressed to move the post 12 down below the plate 15''.

The elastomeric hemisphere 11 can be fabricated from plasticized polyvinyl chloride, a well known commercial commodity, as well as high and low density polyethylene, plasticized cellulose acetate, another well known commodity. Polymethyl acrylate, and similar elastomeric plastics can be injection molded to form the hemisphere and the integral post 12. The thin, uniform, rigid, circular plate 15 can also be injection molded from a selected grade of plasticized polyvinyl chloride, plasticized cellulose acetate, polypropylene, or the like rigid polymer. The sleeve 18 can be formed of the same material as the plate 15, and can be an extension of plate 15. The sleeve 18 can be omitted, providing only a second aperture 16 into which the post 12 slides through.

The cord securing clamp 10 is operated by pushing downward on the clamp plate 20, pushing the post 12 below the plane of the plate 15, exposing the first aperture 14. The two opposed tips of the shoe lace, sport leather tie tip, or the tips of the belt are fed through the first aperture 14 of post 12, and the pressure on the peak 20 released, the post 12 aperture 14 is pulled upward toward the peak 20, and the ties are clamped against plate 15, securing the ties.

Many modifications in the clothing cord securing clamp can be made in the light of my teachings. It is understood that within the scope of the claims, the invention can be practiced otherwise than as described.

I claim:

1. A clothing cord securing claim comprising in combination:

an elastomeric plastic hemisphere having an exterior peak and an internal post of a selected diameter depending from the apex of said hemisphere interior to a position coterminous with an upper edge of an internal groove in the thin wall of said hemisphere, said groove being selectively spaced parallel from said hemisphere diameter, and said selected diameter post having an adaptively sized piercing aperture there through parallel to said hemisphere diameter and disposed a selected distance Just above said upper edge of said groove, and, a thin rigid circular plate securely disposed in said groove, said plate having a centrally disposed second aperture selectively larger in diameter than said post, allowing said post to freely move through said circular plate second aperture.

2. In the combination set forth in claim 1, the modification comprising in combination:

a thin rigid circular plastic plate securely disposed in said groove, said plate having a centrally disposed second aperture selectively larger in diameter than said post, allowing said post to freely move through said central plate second aperture.

3. In the combination set forth in claim 1, the modification comprising in combination:

a thin rigid circular metal plate securely disposed in said groove, said metal plate having a centrally disposed second aperture selectively larger in diameter than said post, allowing said post to freely move through said central plate aperture.

4. In the combination set forth in claim 1, the modification comprising in combination:

a thin rigid circular plastic plate securely disposed in said groove, said plate having a centrally disposed second aperture selectively larger in diameter than said post, allowing said post to freely move through said central plate second aperture, said second aperture having a short guide sleeve formed around said second aperture guiding said post.

5. In the combination set forth in claim 1, the modification comprising in combination:

a thin rigid circular metal plate securely disposed in said groove, said metal plate having a centrally disposed second aperture selectively larger in diameter than said post, allowing said post to freely move through said central plate aperture, said second aperture having a guide sleeve formed around said second aperture guiding said post.

* * * * *